United States Patent [19]

Quakenbush

[11] 4,123,028
[45] * Oct. 31, 1978

[54] SWIVEL SEAT PEDESTAL

[75] Inventor: Howard M. Quakenbush, Apple River, Ill.

[73] Assignee: Flexsteel Industries, Inc., Dubuque, Iowa

[*] Notice: The portion of the term of this patent subsequent to May 24, 1994, has been disclaimed.

[21] Appl. No.: 602,204

[22] Filed: Aug. 6, 1975

[51] Int. Cl.² .......................................... F16M 13/00
[52] U.S. Cl. ..................................... 248/425; 248/418
[58] Field of Search ............................... 108/139–142; 248/415–418, 425; 297/349; 296/65 R

[56] References Cited

U.S. PATENT DOCUMENTS

| | | | |
|---|---|---|---|
| 1,682,989 | 9/1928 | Smelker | 248/425 X |
| 1,902,282 | 3/1933 | Holtgren | 248/425 |
| 1,918,190 | 7/1933 | Miller et al. | 248/417 |
| 2,495,250 | 1/1950 | Gilly | 108/142 X |
| 2,635,677 | 4/1953 | Foster | 248/425 |
| 2,740,463 | 4/1956 | Young | 297/349 X |
| 2,845,990 | 8/1958 | Hubert | 248/425 X |
| 3,191,400 | 6/1965 | Swenson | 297/349 X |
| 3,542,424 | 11/1970 | Bingley | 296/65 R X |
| 3,572,817 | 3/1971 | Colautti et al. | 248/425 X |

FOREIGN PATENT DOCUMENTS

| | | | |
|---|---|---|---|
| 1,448,864 | 7/1966 | France | 297/349 |
| 528,491 | 6/1955 | Italy | 297/349 |
| 1,052,234 | 4/1966 | United Kingdom | 297/349 |

Primary Examiner—Lawrence J. Staab
Attorney, Agent, or Firm—Brezina & Lund

[57] ABSTRACT

A swivel pedestal for a vehicle seat is provided in which a vertical tube is secured at its lower end to a base member and at its upper end is supported by a horizontal top wall of a housing, the tube receiving a tubular shaft rigidly secured to and depending from a rectangular mounting plate adapted to be secured to the other side of a vehicle seat. A brace plate is secured to the mounting plate and has a horizontal portion between the mounting plate and the housing top wall, with a cam portion for camming the upper end of a lock bar outwardly, terminating in a V-shaped notch receiving a V-shaped locking portion of the lock bar, the lock bar being pivoted at its lower end on a horizontal axis and being spring-urged inwardly, and an actuating handle being secured to the upper end of the lock bar. A stop is provided for limiting angular movement of the brace plate and for insuring alignment of the lock bar with the notch at the locking position. The vertical rotational axis is offset from a plane intermediate side edges of the mounting plate and from a plane intermediate the front and back edges of the mounting plate which is centrally located under the seat. A door is provided on the front wall of the housing for access to the space therewithin.

9 Claims, 4 Drawing Figures

SWIVEL SEAT PEDESTAL

This invention relates to a swivel pedestal for a vehicle seat and more particularly to a swivel pedestal which permits swivel movement to desired angular positions and at the same time can be securely locked in a predetermined angular position when the vehicle is in motion. The pedestal is very rugged in construction and, at the same time, is readily operable and is also ecomonically manufacturable.

BACKGROUND OF THE PRIOR ART

Various types of swivel pedestals have heretofore been proposed for use in camper or similar types of vehicles, in which it is desirable to have a seat, especially the driver's seat, in a fixed position during operation of the vehicle while permitting swivel movement of the seat when the vehicle is stopped. In general, the prior art types of swivel pedestals have been complicated in construction and at the same time, they have not been as rugged as would be desirable, presenting in some cases a safety hazard.

SUMMARY OF THE INVENTION

This invention was evolved with the general object of overcoming the disadvantages of prior types of swivel pedestals and of providing a pedestal which is quite simple in construction and operation while permitting the desired swivel movements of a seat and which also can be securely locked in position. In accordance with this invention, a shaft, preferably in the form of a tube, is rigidly secured to and depends from a mounting plate adapted to be secured to the underside of a seat, the shaft being journalled in a tubular member rigidly secured to and upstanding from a base member which is secured to the floor of the vehicle. A generally vertical lock bar is provided having a portion of generally V-shaped cross-section pointing toward the axis of rotation, the lock bar being urged by spring means toward the axis. A brace plate is provided including a horizontal portion in spaced relation below the mounting plate, the brace plate having a peripheral cam edge portion engagable with the lock bar portion to cam the lock bar outwardly during rotation, with a V-shaped notch being provided in the brace plate at the end of the cam portion for receiving the lock bar and providing a secure lock of the mounting plate against rotation.

In accordance with important specific features, the lock bar is pivotal about a horizontal axis close to the floor and spaced from the vertical axis of rotation and a horizontal wall is provided in closely spaced relation below the horizontal portion of the brace plate, the wall having a slot therein for guiding the upper end of the lock bar and restricting movement of the lock bar about the vertical axis of rotation. Preferably, the horizontal wall is the upper wall of a housing, which may have a door opening therein, for receiving articles to be stored.

Another important feature relates to the offset of the vertical axis of rotation from planes intermediate the front and back edges and intermediate the side edges of a mounting plate adapted to be centrally located below the seat, such as to permit desired movements of the seat with adequate clearance while at the same time providing secure support thereof.

Another feature relates to the provision of stop means for cooperation with an edge of the brace plate to stop the rotation at an angle such that the V-shaped portion of the lock bar can engage in the V-shaped notch.

This invention contemplates other objects, features and advantages which will become more fully apparent from the following detailed description taken in conjunction with the accompanying drawings.

DESCRIPTION OF A PREFERRED EMBODIMENT

Figure 3:
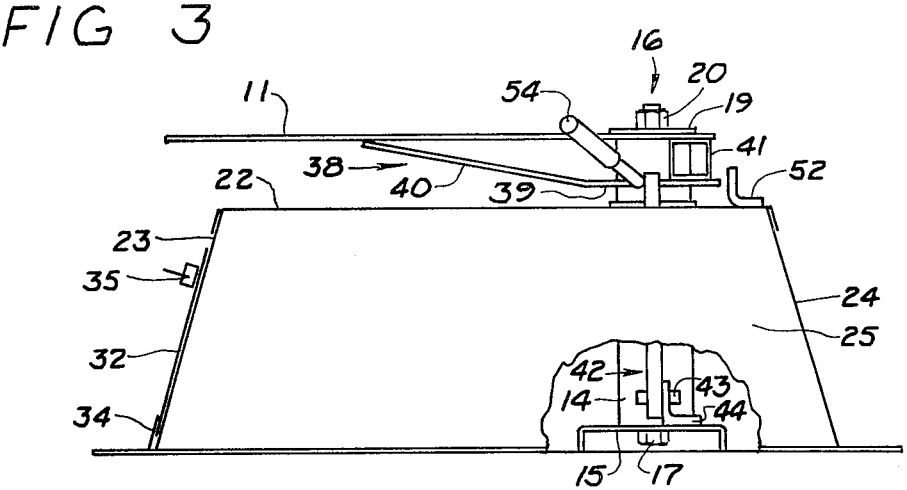
FIG. 3 is a side elevational view of the swivel pedestal of FIG. 1.
Figure 4:
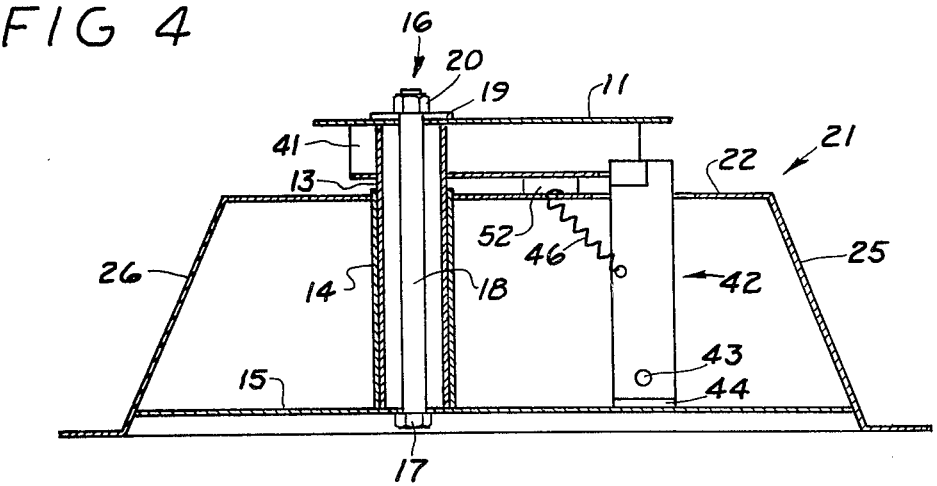
FIG. 4 is a sectional view taken substantially along line IV—IV of FIG. 1.

Reference numeral 10 generally designates a swivel pedestal constructed in accordance with the principles of this invention. The swivel pedestal comprises a mounting plate 11 of rectangular form adapted to be secured in a central position on the underside of a vehicle seat, suitable mounting holes 12 being provided for receiving mounting screws. A vertical shaft 13, preferably in the form of a tube, has its upper end welded or otherwise rigidly secured to the mounting plate 11. The lower end of the tubular shaft 13 extends into and is journalled for rotation by an upstanding tube 14 the lower end of which is welded or otherwise rigidly secured to a support or base member 15 which, as shown in FIG. 3, may be of inverted channel-shaped form. A bolt 16 is provided having a lower head portion 17 under the horizontal wall portion of the member 15 and having a shank portion 18 extending upwardly through an opening in the member 15 concentric to the axis of the tube 14, thence through an opening in the mounting plate 11 and thence through a washer 19, a nut 20 being threaded on the upper end of the shank portion 18. To provide additional support for the tube 14, a housing 21 is provided having a generally rectangular horizontal top wall 22, provided with an opening through which the upper end of the tube 14 projects slightly. The housing 21 further includes a front wall 23, a rear wall 24 and side walls 25 and 26 extending angularly downwardly and outwardly from the four edges of the top wall 22, flanges 27-30 being provided, extending outwardly from the lower edges of the side walls 23-26 and having openings for securing such flanges to the floor of the vehicle. Preferably, the front wall 23 has a rectangular opening therein, adapted to be closed by a door 32 hinged at its lower side to the front wall 23 by hinges 33 and 34, a suitable locking device having a handle 35 being provided. Thus, in addition to providing rigid support for the upper end of the tube 14, the housing 21 provides an enclosed space to which access may be had for storage of tools or other articles.

A brace plate 38 is provided including a generally rectangular portion 39 in a horizontal plane in spaced relation below the mounting plate and spaced a short distance above the top housing wall 22. The brace plate 38 further includes a second generally rectangular portion 40 extending angularly upwardly and outwardly from one edge of the portion 39 to an edge which is welded or otherwise secured to the underside of the mounting plate 11. A spacer member 41 is secured between the portion 39 and the underside of the mounting plate 11.

A lock bar 42 is provided for cooperation with the horizontal portion 39 of the brace plate 38 with respect to locking the mounting plate 11 in a predetermined angular position. At its lower end, the lock bar 42 is supported for pivotal movement about a horizontal axis spaced from the vertical axis of rotation of the mounting plate, by means of a pin 43 extending through the lock bar 42 and through the vertical leg of a bracket 44 having a horizontal leg welded or otherwise secured to the support member 15.

The lock bar 42 is located substantially in the radial plane with respect to the vertical axis of rotation and the upper end thereof is urged radially inwardly by means of a coiled tension spring 46, connected between an intermediate point on the lock bar 42 and the housing top wall 22.

The upper end of the lock bar 42 is formed with a generally V-shaped locking portion 47, the apex of the "V" pointing toward the vertical axis of rotation. Portion 47 is adapted to move into a V-shaped notch 48 in the portion 39 of the brace plate 38 to securely lock the brace plate together with the mounting plate 11 against rotation. It is noted that the upper end portion of the lock bar 42 projects through a radially extending slot 49 in the housing top wall 22, slot 49 serving to guide the upper end of the lock bar in its radial movement and also serving to provide a strong support for resisting movement of the lock bar about the axis of rotation, the top wall 22 being located quite close to the locking portion 47 of the lock bar 42.

Figure 1:
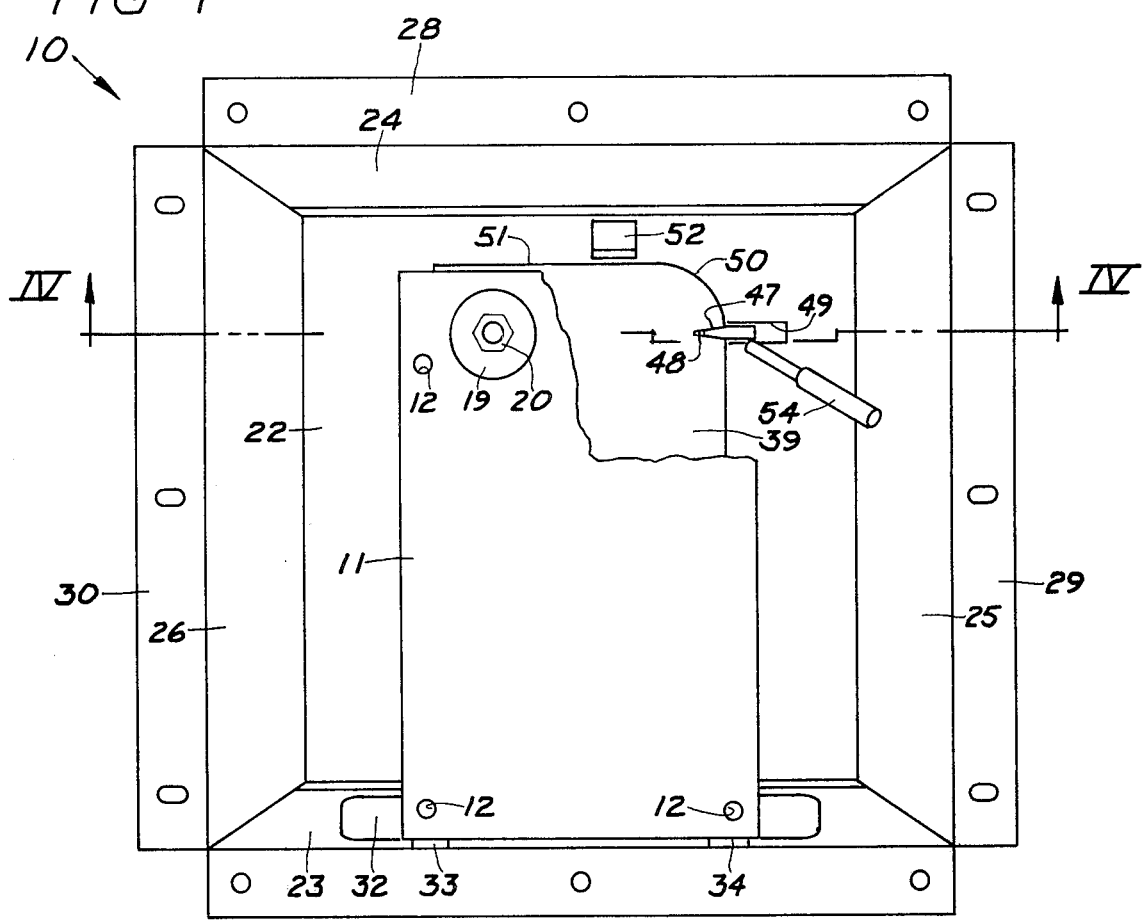
FIG. 1 is a top plan view of a swivel pedestal constructed in accordance with the invention.
Figure 2:
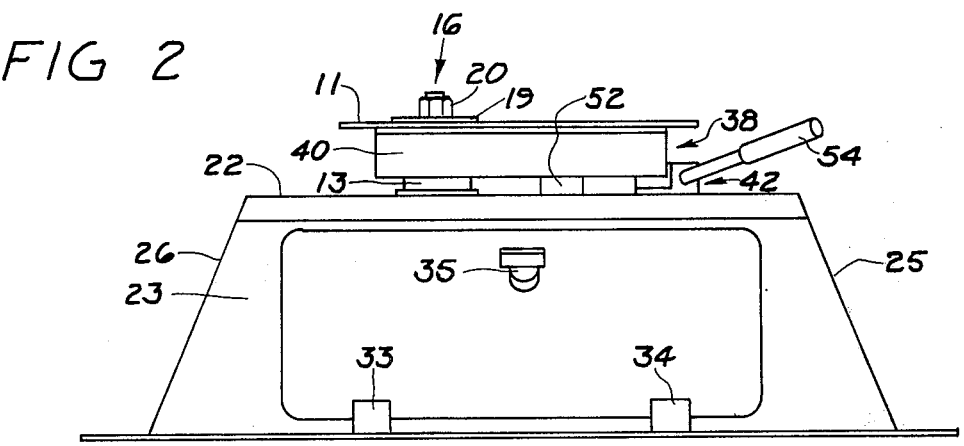
FIG. 2 is a front elevational view of the swivel pedestal of FIG. 1.

Adjacent to the V-shaped notch 48 therein, the portion 39 of the brace plate 38 is provided, at one corner portion thereof, with a cam edge portion 50 which is operative through a predetermined angle of rotation. The cam edge portion 50 has a gradually increasing radial distance from the vertical axis of rotation to cam the upper end of the lock bar 42 radially outwardly against the action of the spring 46, the V-shaped notch 48 being at the large radius end of the cam edge portion 50. The cam edge portion 50, at its small radius end, adjoins one edge 51 of the portion 39 which in the illustrated embodiment is in spaced parallel relation to a vertical plane through the axis of rotation and through the V-shaped notch 48. The edge portion 51 is engagable with an upwardly extending portion of a stop member 52 when the notch 48 is aligned with the locking portion 47 of the lock bar 42. Thus, if it is assumed that the mounting plate is at a position say 90 degrees in a clockwise direction from the position illustrated in FIG. 1 and is then rotated in a counterclockwise direction from the position illustrated in FIG. 1, the cam edge portion 50 will at a certain point engage the end of the locking portion 47 of the lock bar 42 to cam the lock bar outwardly and when the notch 48 is opposite the portion 47, the portion 47 can move into the notch 48. The stop 52, engagable with the edge 51, insures that the mounting plate cannot be swung beyond a position at which the lock bar portion can enter the notch 48 and thus insures locking even when the seat is rapidly swung toward the locking position.

To release the lock and permit swivelling movement of the seat, a handle member 54 is provided, rigidly secured to the upper end of the lock bar 42 and extending angularly outwardly and upwardly therefrom. By pressing down on the end of the handle 54, the lock bar 42 can be readily pivoted against the force of the spring 46 to move the lock portion 47 out of the notch 48 and to permit swivelling movement of the seat.

An important feature is that the vertical axis of rotation is offset a substantial distance from a vertical plane mid-way between the side edges of the mounting plate 11 which is centrally located under the seat. The axis is also offset from a vertical plane mid-way between the sides of the housing 21. In addition, the vertical axis is offset a substantial distance to the rear from a vertical plane midway between the front and back edges of the mounting plate, being quite close to the rearward edge of the mounting plate. Such offsets are advantageous in providing an arrangement allowing seat clearance for swivelling such that the unit can be designed to accept most conditions to avoid interference between the swivel movement of the seat and interior fixed surfaces of the vehicle. In this connection, the illustrated unit is designed for a seat for the right side of a vehicle, i.e. on the passenger side in the case of an American vehicle in which the driver's seat is on the left side. For the seat on the left side of the vehicle, the direction of the offset is reversed. In each case, the offset provides swivelling movement about an axis substantially closer to the side of the vehicle and allows clearance between the seat and the side wall of the vehicle. This feature is particularly important with seats having high backs. At the same time, the rugged construction of the device provides secure support of the seat. It is further noted that the offsets are such as to provide a large radius between the axis of rotation and the interengaging notch and lock bar portions to minimize the force required to restrain the seat against rotation and to thereby reduce the stresses applied to the parts.

It is further noted that with the V-shapes of the notch and lock bar portions, i.e. shapes in which there are opposite surfaces in relative angular converging relation, and with spring pressure being continuously applied, the seat is held against jiggling movement when the device is in its locked position. In addition, there is an automatic take-up with respect to any wear of the interengaging surfaces. The firm support thus provided is very important with respect to the driver's seat.

It will be understood that modifications and variations may be effected without departing from the spirit and scope of the novel concepts of this invention.

I claim as my invention:

1. In a swivel pedestal for a vehicle seat, a mounting plate adapted to be secured to the underside of the seat, a shaft rigidly secured to and depending from said plate, a base member adapted to be rigidly secured to a floor portion of the vehicle, a tubular member rigidly secured to and upstanding from said base member to receive and journal said shaft for rotation about a vertical axis, a brace plate secured to said shaft and said mounting plate and including a horizontal portion in spaced relation below said mounting plate, a generally vertically extending lock bar mounted on said base member and having a portion of generally V-shaped cross-section with the apex of said portion pointing toward said vertical axis, and spring means acting on said lock bar to urge said portion toward said vertical axis and toward engagement with the periphery of said portion of said brace plate, said brace plate having a peripheral cam edge portion engagable with said lock bar portion during rotation of said shaft through a predetermined angle and of gradually increasing radial distance from said axis to cam said lock bar portion radially outwardly against the action of said spring means and having a radially inwardly extending generally V-shaped notch at the large radius end of said cam edge portion to receive said lock bar portion to lock said shaft in said mounting plate in a certain angular position.

2. In a swivel pedestal as defined in claim 1, means supporting a lower end portion of said lock bar for pivotal movement about a horizontal axis spaced from said vertical axis, a fixed horizontal wall spaced a short distance below said base plate and having a radially extending slot for guiding the upper end of said lock bar for movement and for restricting movement of said lock bar portion about said vertical axis.

3. In a swivel pedestal as defined in claim 2, wall means extending angularly outwardly and downwardly from the periphery of said horizontal wall to edge portions adapted to be seured to the floor to provide support for said horizontal wall and to define an enclosed space, said wall means having a door opening therein for access to said enclosed space.

4. In a swivel pedestal as defined in claim 1, said mounting plate being generally rectangular and including front, back and side edges, a plane through said notch and said vertical axis being generally parallel to said front and back edges.

5. In a swivel pedestal as defined in claim 4, said plane through said notch and said vertical axis being offset a substantial distance rearwardly from a plane intermediate said front and back edges.

6. In a swivel pedestal as defined in claim 4, said vertical axis being offset a substantial distance away from said notch and away from a vertical plane intermediate said side edges.

7. In a swivel pedestal as defined in claim 1, said horizontal portion of said brace plate being generally rectangular with said peripheral cam edge portion being at one corner portion thereof and being at one side of a vertical plane through said vertical axis and said notch, and said brace plate including a second generally rectangular portion extending from an edge of said horizontal portion on the opposite side of said vertical plane angularly upwardly to an edge secured to the underside of said mounting plate.

8. In a swivel pedestal as defined in claim 1, a handle rigidly secured to the upper end of said lock bar and extending outwardly and upwardly.

9. In a swivel pedestal as defined in claim 1, said shaft being in the form of a tube.

* * * * *